United States Patent
Tanaka et al.

(10) Patent No.: US 11,178,369 B2
(45) Date of Patent: Nov. 16, 2021

(54) PROJECTION TYPE VIDEO-IMAGE DISPLAY APPARATUS AND PROJECTED VIDEO-IMAGE ADJUSTING METHOD

(71) Applicant: MAXELL, LTD., Kyoto (JP)

(72) Inventors: Kazuhiko Tanaka, Tokyo (JP); Mitsuo Nakajima, Tokyo (JP); Haruhiko Higuchi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 201 days.

(21) Appl. No.: 16/319,667

(22) PCT Filed: Sep. 1, 2016

(86) PCT No.: PCT/JP2016/075594
§ 371 (c)(1),
(2) Date: Jan. 22, 2019

(87) PCT Pub. No.: WO2018/042582
PCT Pub. Date: Mar. 8, 2018

(65) Prior Publication Data
US 2020/0413014 A1 Dec. 31, 2020

(51) Int. Cl.
*H04N 9/31* (2006.01)
(52) U.S. Cl.
CPC ......... *H04N 9/3185* (2013.01); *H04N 9/3141* (2013.01)
(58) Field of Classification Search
CPC ... H04N 9/3141; H04N 9/3185; H04N 9/3194
See application file for complete search history.

(56) References Cited

U.S. PATENT DOCUMENTS 6,456,339 B1 * 9/2002 Surati .................... G03B 37/04
 348/744
10,412,353 B2 * 9/2019 Kuji ........................ G06F 3/011
(Continued)

FOREIGN PATENT DOCUMENTS

JP 2003-289485 A 10/2003
JP 2005-136699 A 5/2005
(Continued)

OTHER PUBLICATIONS

International Search Report issued in corresponding International Patent Application No. PCT/JP2016/075594, dated Nov. 8, 2016, with English Translation.

*Primary Examiner* — John W Miller
*Assistant Examiner* — Humam M Satti
(74) *Attorney, Agent, or Firm* — McDermott Will & Emery LLP

(57) ABSTRACT

Provided are: a video-image transformation unit performing video-image transformation to a video image inputted from outside; a video-image projection unit projecting, onto a video-image projection surface, a video image video-image-transformed by the video-image transformation unit; an image sensor acquiring a projected range of the projected video image projected by the video-image projection unit and an image obtained by photographing a corrected object; and a processor performing a calculation processing using the image photographed by the image sensor. The processor generates correction data from the projected range of the projected video image by the video-image projection unit and the image of the corrected object that are photographed by the image sensor, the video-image transformation unit performs video-image transformation based on the correction data generated by the processor so that the projected range of the projected video image by the video-image
(Continued)

projection unit becomes rectangular on the video-image projection surface.

13 Claims, 13 Drawing Sheets

(56) References Cited

U.S. PATENT DOCUMENTS

| | | | |
|---|---|---|---|
| 2004/0141162 A1* | 7/2004 | Olbrich | G06F 3/017 353/119 |
| 2005/0237492 A1* | 10/2005 | Shinozaki | H04N 5/74 353/69 |
| 2008/0062266 A1* | 3/2008 | Chang | H04N 17/002 348/188 |
| 2011/0175940 A1* | 7/2011 | Terauchi | H04N 9/3188 345/690 |
| 2013/0155202 A1* | 6/2013 | Ogura | H04N 13/246 348/49 |
| 2014/0340529 A1* | 11/2014 | Shibata | H04N 5/74 348/189 |
| 2016/0379077 A1* | 12/2016 | Kropf | G06K 9/4604 382/203 |

FOREIGN PATENT DOCUMENTS

| | | |
|---|---|---|
| JP | 2006-101140 A | 4/2006 |
| JP | 2007-053784 A | 3/2007 |

* cited by examiner

CAMERA VIEWPOINT CP

FRONT VIEWPOINT FP

PROJECTION TYPE VIDEO-IMAGE DISPLAY APPARATUS AND PROJECTED VIDEO-IMAGE ADJUSTING METHOD

CROSS REFERENCE

This application is the U.S. National Phase under 35 U.S.C. § 371 of International Application No. PCT/JP2016/075594, filed on Sep. 1, 2016, the entire contents are hereby incorporated by reference.

TECHNICAL FIELD

The present invention relates to a projection type video-image display apparatus and a projected video-image adjusting method, more particularly, a technique effective for correcting keystone correction distortion occurring when a projector and a screen do not confront (face) each other directly.

BACKGROUND ART

A video-image display apparatus that displays a video image (s) on a large screen at low cost, a so-called projector, has widely been used at a presentation site(s), and an educational site(s), etc. Display of the video image by the projector without geometric distortion requires that the projector and the screen face each other directly.

However, since a viewer(s) is present in front of the screen, there is a case where the video image can be projected only from an oblique direction in using the projector. In this case, geometric distortion called keystone distortion occurs on the screen.

For example, when the screen is installed so that an upper side of the screen is close to the projector and its lower side is far, a square video image projected from the projector is projected with an upper side of the square being shorter than a lower side thereof, so that a rectangular image is displayed on the screen in a trapezoidally distorted state.

The same phenomenon actually occurs not only in upward and downward but also rightward and leftward. Therefore, a rectangular video image projected from the projector can be projected as a distorted quadrangle having no parallel sides. Thus, those distortions are generally referred to as keystone distortion including figures each having no parallel sides conventionally.

The keystone distortion is to previously apply, to a to-be-projected video image(s), geometric correction in a direction opposite to geometric transformation corresponding to the keystone distortion so as to cancel distortions, thereby making it possible to display the video image in a right shape(s).

This geometric correction, in other words, geometric transformation is called perspective transformation or projective transformation, and can be realized by matrix calculation. Calculation of this matrix needs to acquire information on a shape and a position of a to-be-projected object by some techniques.

One technique for realizing this is described in Patent Document 1. The technique of Patent Document 1 is a technique of: photographing, with a camera(s), a known pattern previously drawn on a screen serving as a projected object to acquire a direction of the screen; and performing keystone correction by correcting a video image(s) in accordance with the acquired direction.

RELATED ART DOCUMENTS

Patent Documents

Patent Document 1: Japanese Patent Application Laid-open No. 2007-53784

SUMMARY OF THE INVENTION

Problems to be Solved by the Invention

However, the above technique of Patent Document 1 needs to calculate a transformation matrix by using the pattern drawn on the screen. Therefore, no special screen on which the pattern is drawn brings a problem of being unable to perform correction of a projected image.

Additionally, as described above, the special screen on which the pattern is previously drawn is required, and so is unsuitable for use applications of bringing a projector to a customer and projecting the image on a wall, which may impair convenience.

Further, if the special screen on which the pattern is drawn is used, this pattern can be seen even during normal video-image projection, which may hinder the customer from viewing the image. In order to prevent this, it is also possible to draw a pattern(s) with a special ink(s) such as an infrared absorption ink(s) which is not visible to human eyes. In this case, however, an infrared light source, an infrared camera, or the like becomes necessary, which leads to an increase in cost.

Furthermore, when the screen is installed in an inclined state, the pattern drawn on the screen is also tilted, which makes a to-be-projected video image tilted, too.

An object of the present invention is to provide a technique capable of more suitably correcting the distortion of the projected video image.

The above and other objects and novel characteristics of the present invention will be apparent from the description of the present specification and the accompanying drawings.

Means for Solving the Problems

The following is a brief description of an outline of the typical invention disclosed in the present application.

That is, a typical projection type video-image display apparatus includes a video-image transformation unit, a video-image projection unit, an image sensor, and a processor. The video-image transformation unit performs video-image transformation to a video image inputted from outside. The video-image projection unit projects, onto a video-image projection surface, the video image video-image-transformed by the video-image transformation unit.

The image sensor acquires a projected range projected by the video-image projection unit, and an image obtaining by photographing a corrected object. The processor performs a calculation processing to the image captured by the image sensor.

Additionally, the processor generates correction data from the projected range of the video-image projection unit and the image of the corrected object, which are photographed by the image sensor. The video-image transformation unit performs the video-image transformation based on the correction data generated by the processor so that the projected range of the projected video image of the video-image projection unit becomes rectangular.

Particularly, the processor has a detector and a transformation matrix calculation unit. The detector calculates first coordinate data and second coordinate data from the projected range and the image of the correction object that are photographed by the image sensor, the first coordinate data indicating each of coordinates of four-corner portions of the projected range, and the second coordinate data indicating each of coordinates of four-corner portions of the corrected object.

The transformation matrix calculation unit calculates third coordinate data indicating each of coordinates of four-corner portions by which the image of the corrected object becomes rectangular, and calculates a transformation matrix to be the correction data based on correspondences to the third coordinate data and the second coordinate data.

Then, the video-image transformation unit uses the transformation matrix calculated by the transformation matrix calculation unit, performs perspective transformation to the first coordinate data calculated by the detector, and transforms the video image so that the projected range of the projected video image becomes rectangular.

Effects of the Invention

Effects obtained by representative ones of the inventions disclosed in the present application will be briefly described as follows.

The projected image(s) by the projection type video-image display apparatus can be corrected easily and in a short time.

BRIEF DESCRIPTIONS OF THE DRAWINGS

DETAILED DESCRIPTION OF PREFERRED EMBODIMENTS

In embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above. For example, in the following embodiments, simple expression of "vertical" means not only a strictly "vertical" state but also a state belonging to a range included in a concept of a "substantially vertical" state. Similarly, simple expression of "horizontal" means not only a strictly "horizontal" state but also a state belonging to a range included in a concept of "substantially horizontal" state.

Also, in some drawings used in the following embodiments, hatching is omitted even in a cross-sectional view so as to make the drawings easy to see. In addition, hatching may be used even in a plan view so as to make the drawings easy to see.

Embodiment 1

<Outline>

A projector 10 according to Embodiment 1 corrects keystone distortion by using a rectangular card 1. The rectangular card 1 is held up in front of a camera 30 built in the projector 10 and is photographed, and a direction of the card is adjusted. Change of geometric transformation matrix of the projector 10 in accordance with a posture (attitude) of the card 1 photographed by the camera 30 makes it possible to intuitively adjust keystone correction distortion.

Mixture of keystone distortions in horizontal and vertical directions especially brings merits capable of intuitive operation. A rectangular object such as a business card or A4-sized copy paper is usable as the rectangular card 1, and so can be easily obtained from visited sites etc.

Hereinafter, embodiments will be described in detail.

<Example of External Appearance of Projector>

Figure 1:
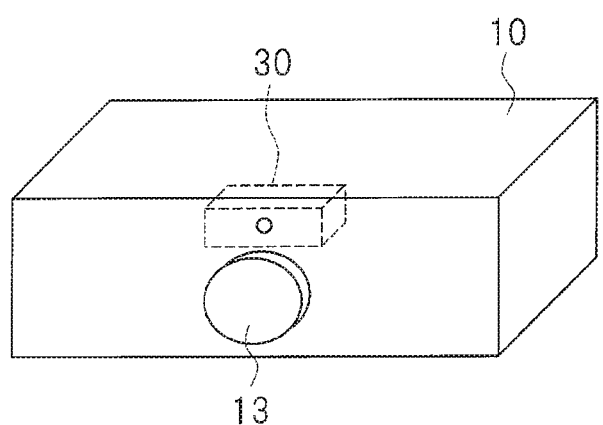
FIG. 1 is an explanatory diagram showing an example of an external appearance of a projector according to an embodiment.

FIG. 1 is an explanatory diagram showing an example of an external appearance of the projector 10 according to the present embodiment.

The projector 10 is a projection type video-image display apparatus for projecting a video image(s) on a screen or the like. A projection lens 13 is provided on a front surface which is one side surface of a housing of the projector 10.

Similarly, the camera 30 is provided on the front surface of the projector 10 and above the lens 13. FIG. 1 shows an example in which a body of the camera 30 is built in the housing of the projector 10 and a lens of the camera 30 is exposed from the front surface of the projector 10.

Further, it is assumed that the camera 30 as an image sensor has an angle of view sufficient to cover a video-image projection range of the projector 10. However, a structure of the projector 10 is not limited to this and, for example, the camera 30 may not be built in the projector 10.

<Configuration Example of Projector>

Figure 2:
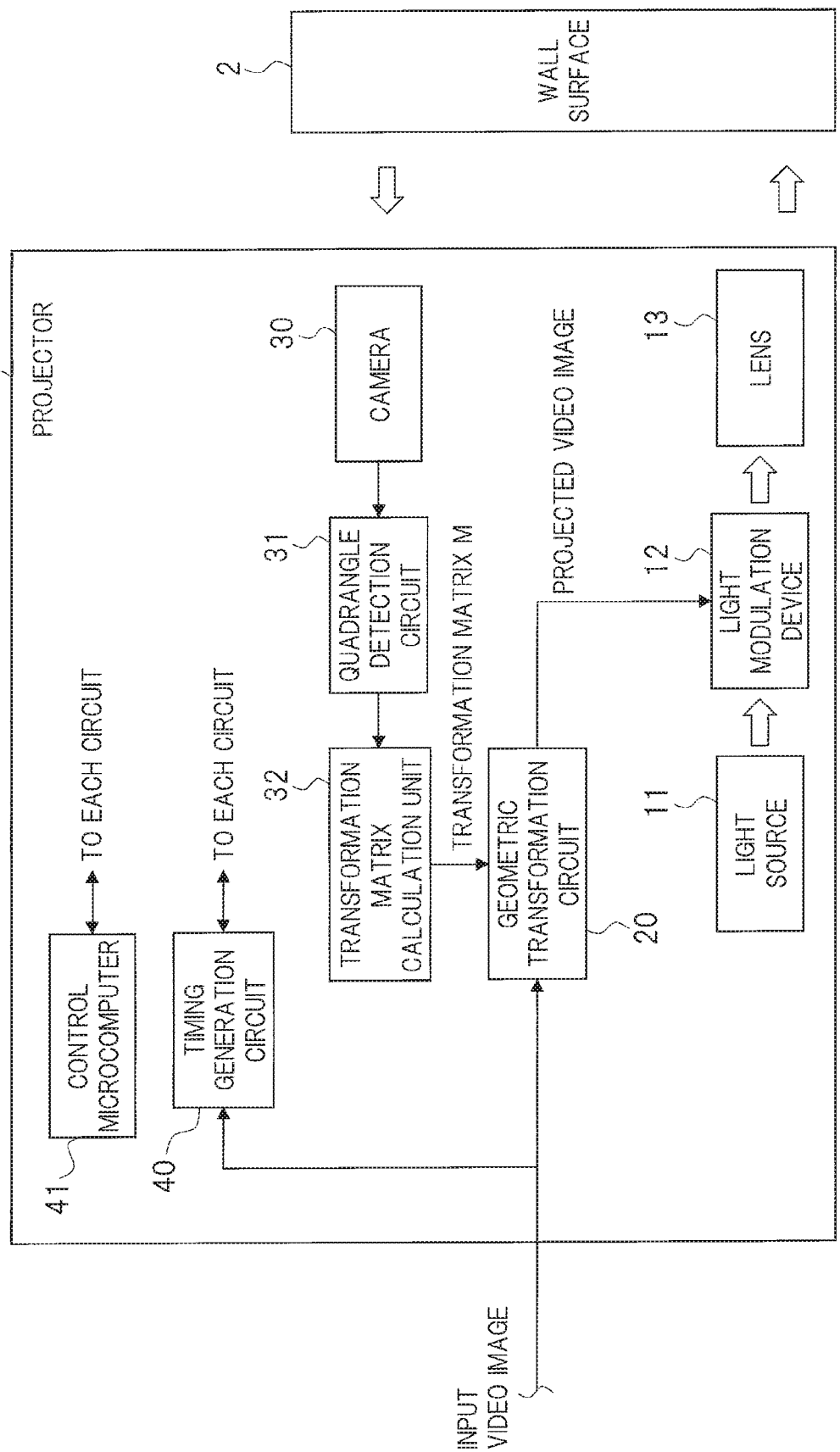
FIG. 2 is an explanatory diagram showing an example of a configuration of the projector of FIG. 1.

FIG. 2 is an explanatory diagram showing an example of a configuration of the projector 10 of FIG. 1.

The projector 10 includes a light source 11, a light modulation device 12, a lens 13, a geometric transformation circuit 20, the camera 30, a quadrangular detection circuit 31, a transformation matrix calculation circuit 32, a control microcomputer 41, and a timing generation circuit 40.

An input video image(s) inputted from outside is subjected to geometric transformation by the geometric transformation circuit 20 to be a video transformation unit and is then outputted, as a projected video image(s), to the light modulation device 12. An input video image inputted to the projector 10 is, for example, video-image data outputted from a personal computer or the like connected to the projector 10.

The light modulation device 12 is an element that modulates light from the light source 11 in accordance with the projected video image outputted from the geometric conversion circuit 20. For example, a liquid crystal panel, DMD (Digital Mirror Device), or the like is used as the light modulation device. The light source 11 generates illumination light for projection.

The illumination light from the light source 11 is modulated by the light modulation device 12, outputted from the projector 10 through the lens 13, and then irradiated to a wall surface 2, a screen, or the like as a projected object. The light source 11, light modulation device 12, and lens 13 configure a video-image projection unit.

A general projector, in which a plurality of light sources 11 and light modulation devices 12 are mounted for colorizing video images and which uses a special mirror or the like to perform composition of light and folding of light path, is not shown in FIG. 2, but the present embodiment is also effective to such a general projector.

In handling a color image (s), the input video image is composed of a plurality of color component images. Therefore, it is assumed that the geometric transformation circuit 20 performs parallel processings up to the number of color components. Additionally, a transformation matrix M used by the geometric transformation circuit 20 uses a matrix common to the respective color components.

Here, the geometric transformation circuit 20 is a circuit for performing correction of geometric distortion, so-called keystone distortion, caused by the reason that the projector 10 and the wall surface 2 do not face each other directly. This geometric transformation is performed by multiplying a 3×3 matrix at homogeneous coordinates. Details of this calculation will be described later.

The quadrangular detection circuit 31 serving as a detector detects a quadrangular region with respect to an image photographed by the camera 30, and the transformation matrix calculation circuit 32 calculates the transformation matrix M used in the geometric transformation circuit 20 by using reference points such as four-vertex coordinates of the quadrangle obtained therefrom. Additionally, the quadrangular detection circuit 31 and the transformation matrix calculation circuit 32 configure a processor.

Incidentally, the quadrangular detection circuit 31, transformation matrix calculation circuit 32, and geometric transformation circuit 20 in the present embodiment is each configured by using a dedicated circuit. However, those may be implemented through software, for example, by using a CPU (Central Processing Unit), a GPU (Graphic Processing Unit), or the like.

The control microcomputer 41 performs control of the projector 10. The timing generation circuit 40 generates clock signals such as a vertical synchronization signal and a horizontal synchronization signal which are timing signals in displaying an image(s).

<Projection and Correction Examples of Projector Using Cards>

Figure 3:
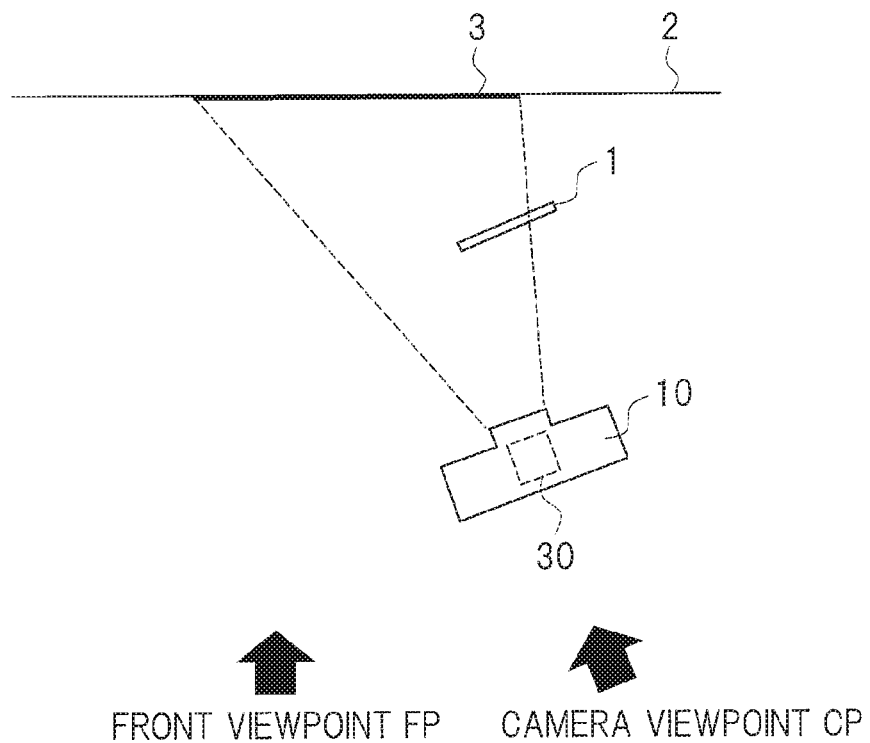
FIG. 3 is an explanatory diagram showing an example of projecting an image by the projector of FIG. 1.

FIG. 3 is an explanatory diagram showing an example of video-image projection by the projector 10 of FIG. 1. FIG. 3 shows an example in which the projector 10 projects a video image on the wall surface 2, and shows an arrangement state of the projector 10, the wall surface 2, and the later-described card 1 when they are viewed from directly above.

In the example shown in FIG. 3, the projector 10 is disposed at a certain angle with respect to the wall surface 2 as a projection surface, in other words, arranged so as not to directly face the projection surface but oblique to the projection surface.

The card 1 between the projector 10 and the wall surface 2 is a card having a rectangular shape such as a rectangle having an aspect ratio of a:b, and becomes a corrected object. The card 1 does not need to be a dedicated card, and may be a business card, A4-sized copy paper, or the like. A user holds the card 1 in his/her hand, and uses it by holding it in a shooting range of the camera 30.

The wall surface 2 is a flat (planar) wall surface, and a projector-projected range 3 is the maximum projectable range of the video image projected by the projector 10. If the projector 10 and the wall surface 2 are fixed, the projector-projected range 3 is uniquely determined.

Figure 4:
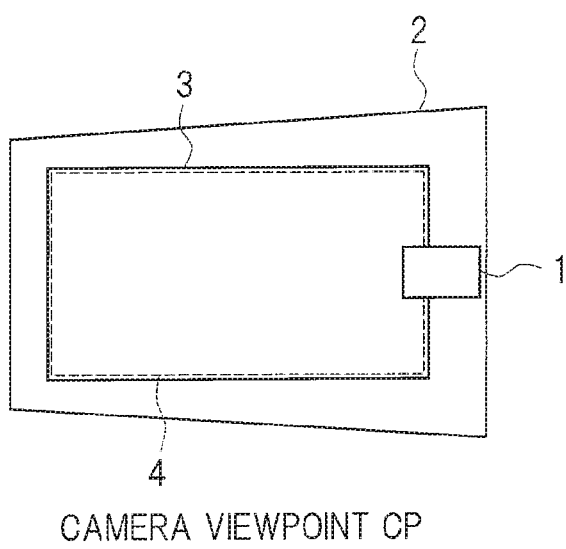
FIG. 4 is an explanatory diagram showing an example of viewing a wall surface and a card from a camera position in the example of the projection by the projector of FIG. 3.

FIG. 4 is an explanatory diagram showing an example of the wall surface 2 and card 1 that are viewed from a camera position in an example of projection by the projector 10 of FIG. 3. Therefore, FIG. 4 is a view that is viewed from a camera viewpoint CP shown in FIG. 3.

Figure 5:
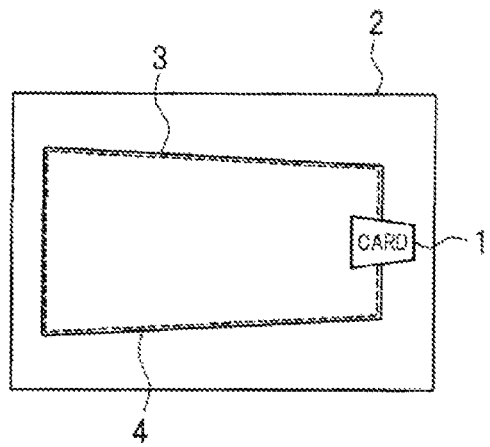
FIG. 5 is an explanatory view showing an example that is viewed from a position directly facing the wall surface in the example of the projection by the projector in FIG. 3.

FIG. 5 is an explanatory diagram showing an example that is viewed from a position directly facing the wall surface 2 in an example of projection by the projector 10 of FIG. 3.

Therefore, FIG. 5 is a view that is viewed from a front viewpoint FP shown in FIG. 3.

When the video image of the projector 10 is corrected by the geometric transformation, the corrected video image is projected onto a real video-image area 4 each shown in FIGS. 4 and 5. The real video-image area 4 is included in the projector-projected range 3, and a region not included in the real video-image area 4 within the projector-projected range 3 is processed as a black video-image area.

If the camera 30 and the lens 13 in the projector 10 are sufficiently close to each other, the projector-projected range 3 appears to be substantially rectangular regardless of a positional relation between the wall surface 2 and the projector 10 as shown in FIG. 4 and viewed from the camera viewpoint CP. This is because the geometric distortion generated when the projector 10 projects the video image onto the wall surface 2 and the geometric distortion generated when the camera 30 photographs the video image on the wall surface 2 cancel each other out.

The card 1 appears to be, from a position of the camera 30, a quadrangle to which the keystone distortion is added in accordance with a direction of the card 1 to the camera 30. However, it is assumed that the card 1 in each example shown in FIGS. 3 to 5 is placed in such a direction as to directly face the camera 30. Therefore, the card 1 also appears to be a rectangle from the position of the camera.

In order to make it easy to grasp the direction of the wall surface 2, each of FIGS. 4 and 5 shows an outer frame of the wall surface 2 about how this rectangle is observed from the wall surface 2 and each of the viewpoints on the premise of the rectangle being drawn on the wall surface 2.

Meanwhile, when the rectangle is viewed from a position of directly facing the wall surface 2, that is, from a front viewpoint FP, the keystone distortion occurs in the projector-projected range 3 as shown in FIG. 5, so that the rectangle appears to be a distorted quadrangle. In order to simplify the explanation in this example, it is assumed that only horizontal keystone distortion occurs. However, the above assumption is effective even when vertical keystone distortion occurs concurrently therewith. When the card is viewed from the position of directly facing the wall surface 2, the keystone distortion occurs also on the card 1.

The transformation matrix calculation circuit 32 calculates a transformation matrix M serving as a geometric transformation matrix based on a shape of the card 1 as viewed from the camera viewpoint CP. The geometric transformation circuit 20 uses the transform matrix M to perform geometric transformation to an input video image(s), and projects its result(s). The transformation matrix M becomes correction data.

In the positional relation shown in FIG. 3, no distortion occurs on the card 1 when the card is viewed from the camera viewpoint CP, and so the card looks like a rectangle. Therefore, the geometric transformation from the input video image to the projected video image is performed only as a scaling processing for resolution conversion, so that its shape is not changed.

This brings the projection of the video image onto the entire projector-projected range 3 in both of FIGS. 4 and 5. That is, the real video-image area 4 as an area, in which the video image is displayed on the wall surface 2, perfectly coincides with the projector-projected range 3. Incidentally, FIGS. 4 and 5 are drawn with such slight shift that both do not overlap each other, but they actually overlap each other completely.

Incidentally, FIGS. 4 and 5 show that the real video-image area 4 is an area indicated by a dotted line and the projector-projected range 3 is an area indicated by a solid line.

Next, considered is a case where the card 1 is held so as to be parallel to the wall surface 2.

Figure 6:
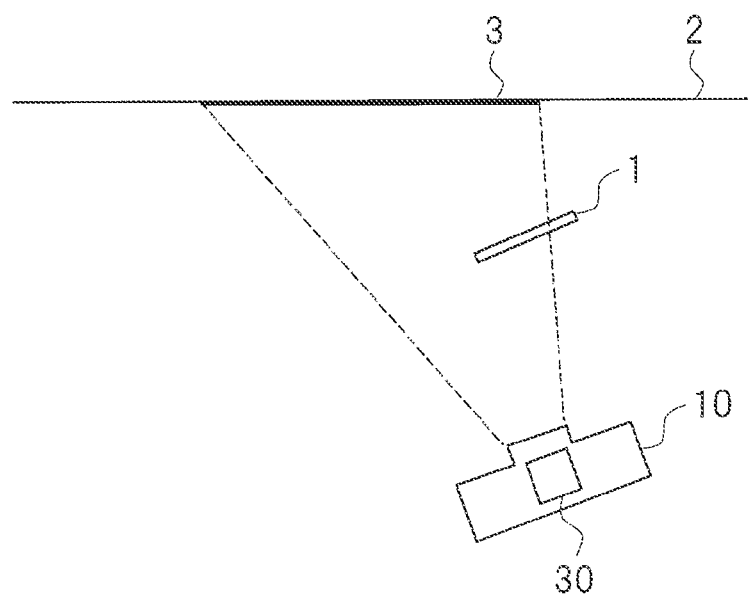
FIG. 6 is an explanatory diagram showing another example of FIG. 3.

FIG. 6 is an explanatory diagram showing another example of FIG. 3. In FIG. 6, the card 1 is held so as to be parallel to the wall surface 2. FIG. 6 shows an example in which the projector 10 projects a video image onto the wall surface 2 similarly to FIG. 3, and shows a view of the arrangement state of the projector 10, wall surface 2, and card 1 when they are viewed from directly above.

Figure 7:
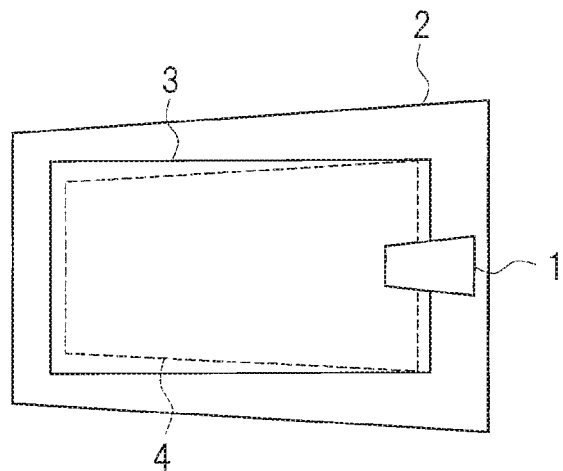
FIG. 7 is an explanatory diagram showing an example of viewing a wall surface and a card from a camera position in an example of projection by the projector of FIG. 6.

FIG. 7 is an explanatory diagram showing an example of the wall surface 2 and card 1 as viewed from the camera position in the example of the projection by the projector 10 of FIG. 6. Therefore, FIG. 7 is a view as viewed from the camera viewpoint CP shown in FIG. 6.

Figure 8:
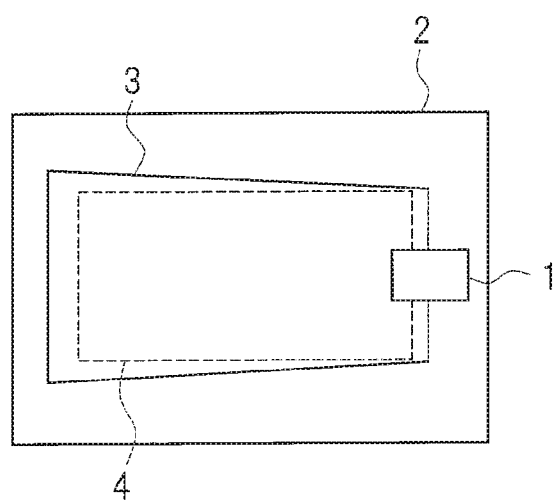
FIG. 8 is an explanatory diagram showing an example that is viewed from a position directly facing the wall surface in the example of the projection by the projector of FIG. 6.

FIG. 8 is an explanatory diagram showing an example as viewed from a position of directly facing the wall surface 2 in the example of the projection by the projector 10 of FIG. 6. Therefore, FIG. 8 is a view as viewed from the front viewpoint FP shown in FIG. 6.

In FIG. 7, since the card 1 is not directly facing the camera 30, the keystone distortion appears to occur. In this case, a shape of this distortion is specified from the image photographed by the camera 30, the transformation matrix M is calculated based on the photographed image, and the geometric transformation due to this matrix is applied to the input video image. Consequently, the input video image is transformed (converted) into a range of the real video-image area 4.

As viewed from the front viewpoint FP, the card 1 appears such a rectangle as to maintain the card's original aspect ratio (a:b). Similarly thereto, as shown in FIG. 8, the real video-image area 4 can be projected as a rectangle that has the projector's original aspect ratio, i.e., an aspect ratio=A:B in installing the projector so that no keystone distortion occurs.

As described above, the projector 10: calculates the transformation matrix M based on the shape of the keystone distortion in photographing the card 1 by the camera 30; uses the calculated transformation matrix to perform the geometric transformation to the input video image by the geometric transformation circuit 20; and projects the obtained video image onto the wall surface 2.

Doing so makes it possible to deform the video image projected onto the wall surface 2 and adjust the keystone distortion as if the wall is moved in conjunction with turning of the direction of the card 1.

This technique makes it possible to make an intuitive adjustment since keystone distortion of a projector-projected vide image as viewed from a viewpoint FP position of directly facing the wall surface 2 disappears at a time of making the wall surface 2 and card 1 parallel.

<Calculation Processing Example of Transformation Matrix M>

Subsequently, described will be a technique in which the transformation matrix calculation circuit 32 calculates the transformation matrix M based on the shape of the card 1 photographed by the camera 30.

The images video-image-projected by the projector 10 and photographed by the camera 30 are deformed based on transformation called perspective transformation. Performing the perspective transformation makes it possible to display an object so that the object close to or distant from the projector or camera respectively appears to be large or small similarly to the real world.

When a point (xi, yi) in a certain coordinate system is transformed to a point (xo, yo) in another coordinate system by the perspective transformation, Equation 1 is satisfied between both points.

$$\begin{bmatrix} xo \\ yo \\ 1 \end{bmatrix} = \begin{bmatrix} a00 & a01 & a02 \\ a10 & a11 & a12 \\ a20 & a21 & 1 \end{bmatrix} \begin{bmatrix} xi \\ yi \\ 1 \end{bmatrix} \quad \text{(Equation 1)}$$

This equation is written with homogeneous coordinates, and xo and yo can be obtained by Equations 2a and 2b as described below.

$$xo = \frac{a00*xi + a01*yi + a02}{a20*xi + a21*yi + 1} \quad \text{(Equation 2a)}$$

$$yo = \frac{a10*xi + a11*yi + a12}{a20*xi + a21*yi + 1} \quad \text{(Equation 2b)}$$

The 3×3 matrix in Equation 1 is a transformation matrix defining the perspective transformation. This transformation matrix can be specified by obtaining eight variables from a00 to a21 which are elements of the matrix. Eight equations are required to obtain eight unknowns. For this reason, it is enough to know four sets composed of (xi, yi) and (xo, yo). That is, knowing which points the four points on the video image before the perspective transformation are respectively transformed into makes it possible to obtain the transformation matrix. Here, calculated by using the above manner is the transformation matrix M.

Subsequently, a technique of calculating the transformation matrix M for the perspective transformation will be described with reference to FIGS. 9 and 10.

Figure 9:
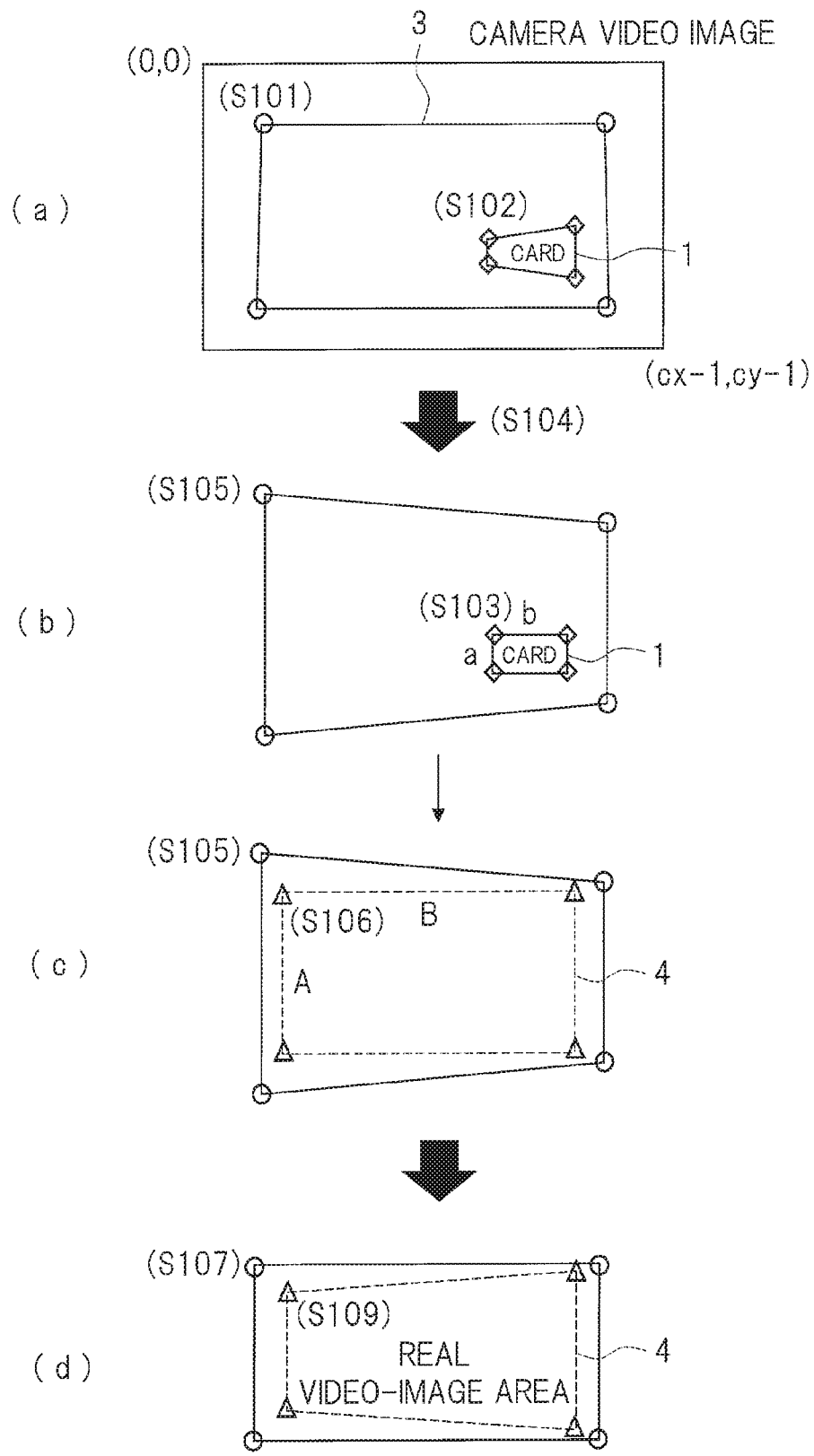
FIG. 9 is an explanatory diagram showing a processing example of each coordinate system.

FIG. 9 is an explanatory diagram showing a processing example in each coordinate system. FIG. 9 represents each of three coordinate systems required in a process of calculating the transformation matrix M. Each coordinate system is a two-dimensional XY coordinate system in which an X coordinate increases in a right direction and a Y coordinate increases in a downward direction.

Hereinafter, each coordinate system is shown.

First, a coordinate system shown in FIG. 9(a) is a camera coordinate system. This camera coordinate system is a coordinate system for representing the entire image photographed by the camera 30. If it is assumed that resolution of the camera-photographed image is (cx, cy), a coordinate of an upper-left pixel is (0, 0) and a coordinate of a lower-right pixel is (cx−1, cy−1).

Each of coordinate systems shown in FIGS. 9(b) and 9(c) is a front-view coordinate system. The front-view coordinate system is a coordinate system in viewing the wall surface 2 from the front surface, and has the same meaning as that of the coordinate system on the wall surface 2. Since a reference length and a reference point do not exist on the wall surface 2, an origin and a scale can be freely determined.

A coordinate system shown in FIG. 9(d) is an input video-image coordinate system. The input video-image coordinate system is a coordinate system for the input video-image. If it is assumed that resolution of the input video image is (bx, by), a coordinates of an upper-left pixel is (0, 0) and a coordinate of a lower-right pixel is (bx−1, by−1).

Figure 10:
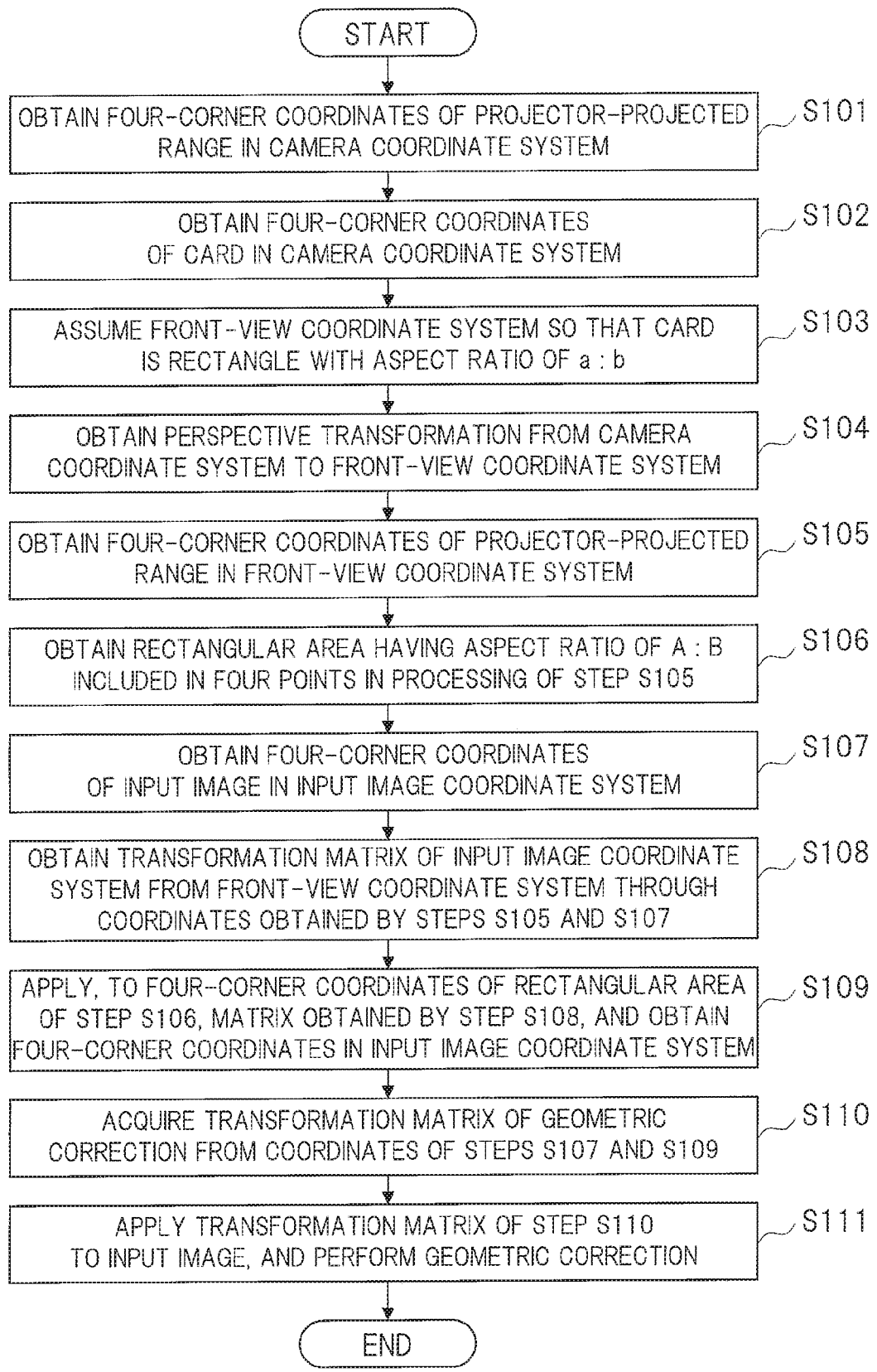
FIG. 10 is a flowchart showing an example of an calculation processing of a transformation matrix M by a transformation matrix calculation circuit included in the projector of FIG. 2.

With reference to these coordinate systems shown in FIG. 9 and the flowchart of FIG. 10, a calculation processing of the transformation matrix M will be sequentially described.

FIG. 10 is a flowchart showing an example of a calculation processing of the transformation matrix M by the transformation matrix calculation circuit 32 that the projector 10 of FIG. 2 has.

First, the projector 10 projects a full solid white image (rectangle) into the entire projected range. The camera 30 photographs the image, the quadrangle detection circuit 31 extracts a quadrangle corresponding to the projector-projected range 3, and then coordinates of four corners in a camera coordinate system, which is first coordinate data, are obtained (step S101). That is, in this case, the four-corner coordinates of the projector-projected range 3 are set as reference points of the projector-projected range 3. This corresponds to obtaining coordinates of four apexes with circles in FIG. 9(a). A user has only to perform this operation in installing the projector 10.

Subsequently, the quadrangle detection circuit 31 extracts an area of the card 1 included in the video image photographed by the camera 30, and obtains coordinates of four corners in the camera coordinate system, which is second coordinate data (step S102). That is, in this case, the four-corner coordinates of the card 1 are used as reference points of the card 1.

This corresponds to obtaining coordinates of four apexes with diamond shapes in FIG. 9(a). These coordinates to be reference points vary as an attitude of the card 1 varies, so that regularly obtaining the attitude is required in operating the card 1.

Then, a front-view coordinate system as a new coordinate system, which is third coordinate data, is defined by setting, as a reference, the aspect ratio of a:b of the card 1 (step S103). The card 1 in this coordinate system is represented as a rectangle with the aspect ratio of a:b. This coordinate system is a virtual coordinate system, so that an origin position and a scale can be freely defined.

Here, an upper-left corner of the card 1 is defined as an origin (0, 0), and a lateral width of the card 1 is defined as a length of one. In this case, height of the card 1 is represented by a/b. Four apexes of the card 1 in the front-view coordinate system correspond to the diamond shapes of FIG. 9(b).

As described above, a perspective transform matrix between the two coordinate systems can be derived if four-point coordinates in the coordinate system before and after the transformation are obtained. That is, the perspective transformation matrix from the camera coordinate system to the front-view coordinate system is calculated from the coordinates of the four apexes of the card 1 obtained in the processings of steps S102 and S103 (step S104).

Coordinates of four apexes of the projector-projected range 3 in the front-view coordinate system can be obtained by using the transformation matrix obtained in the processing of step S104 to perform the perspective transformation to the four-apex coordinates of the projector-projected range 3 in the camera coordinate system, which are obtained by the processing of step S101 (step S105).

An aim of the processing shown in FIG. 10 is to project, from a viewpoint of directly facing the wall surface 2, the video image of the projector 10 into a rectangle having an original aspect ratio (A:B) of the projector when the card 1 appears to be a rectangle having the aspect ratio of a:b.

In order to realize this, the real video-image area 4 in the front-view coordinate system may require to be a rectangle having the aspect ratio of A:B. Since the four-corner coordinates of the projector-projected range 3 are known from the processing of step S105, definition of the rectangle having the aspect ratio of A:B included in the above coordinates makes it possible to obtain the coordinates of the four corners (step S106). This corresponds to obtaining coordinates of four apexes with triangle shapes in FIG. 9(c).

Subsequently, considered is an input video-image coordinate system which is a coordinate system using, as an origin (0, 0), an upper-left corner of the input video image. In this coordinate system, the four-apex coordinates of the input video image are obtained from the definition of the above-mentioned coordinate system (step S107). This corresponds to four apexes with circles in FIG. 9(d).

The input video image 5 becomes a quadrangle, whose apexes are the four points obtained by the processing of step S105, in the front-view coordinate system and becomes is a quadrangle, whose apexes are the four points obtained in the processing of step S107, in the input video-image coordinate system. A correspondence relation between the four-point coordinates is known, and so is used to calculate the perspective transform matrix from the front-view coordinate system to the input video-image coordinate system (step S108).

The four-apex coordinates obtained in the processing of step S106 are transformed by using the perspective transformation matrix obtained in the processing of step S108. This transformation makes it possible to obtain the four-apex coordinates of the input video image 5 in the input video-image coordinate system after the keystone correction performed in accordance with the shape of the card 1 in the camera video image (step S109). This corresponds to the four apexes with triangle shapes of FIG. 9(d).

Then, obtained from the four-apex coordinates of the input video image 5 before the keystone correction obtained in the processing of step S107 and the four-apex coordinates of the input video image 5 after the keystone correction obtained in the processing of step S109 is the transformation matrix M for the keystone correction in the input video-image coordinate system (step S110).

Obtained by the above processings is the transformation matrix M for performing the keystone correction in accordance with the direction of the card 1 in the camera image. The geometric transformation circuit 20 applies the transformation matrix M to perform the geometric correction, that is, the keystone distortion correction (step S111).

As described above, the user has only to hold the card 1 in front of the projector 10, thereby being capable of adjusting the keystone correction of the projected video image.

This makes it possible to realize a correction processing of the projected video image easily and in a short time without using a special screen etc. on which a pattern(s) is printed. Further, unnecessity of the special screen etc. on which the pattern is printed makes it possible to improve convenience.

Embodiment 2

<Outline>

Embodiment 1 described above has defined the rectangle of the real video-image area 4 in accordance with the coordinate using, as a reference, the rectangle of the card 1 in the processing of step S106 in FIG. 10. Therefore, when the card 1 is not perfectly horizontal but is kept tilted, the real video-image area 4 also tilts in accordance with its tilt.

This is a convenient function when the user wishes to adjust the tilt of the projected video image by manipulating the card, while leading to inconvenience since a slight tilt of the card 1 causes the tilt of the video image in projecting the video image with the video image always kept horizontal.

Therefore, described in Embodiment 2 will be a technique in which the tilt (inclination) of the card 1 does not affect a tilt of the projected video image. The tilt of the projector 10 is acquired by using a gravity sensor 50 built in the projector 10. Considering the tilt of the projector 10 in calculating the geometric transformation matrix makes it possible to make a correction so that the projected video image becomes horizontal even if the card 1 is not perfectly horizontal. This makes it possible to further improve usability since the card 1 does not require to be strictly kept horizontal.

<Configuration Example of Projector>

Figure 11:
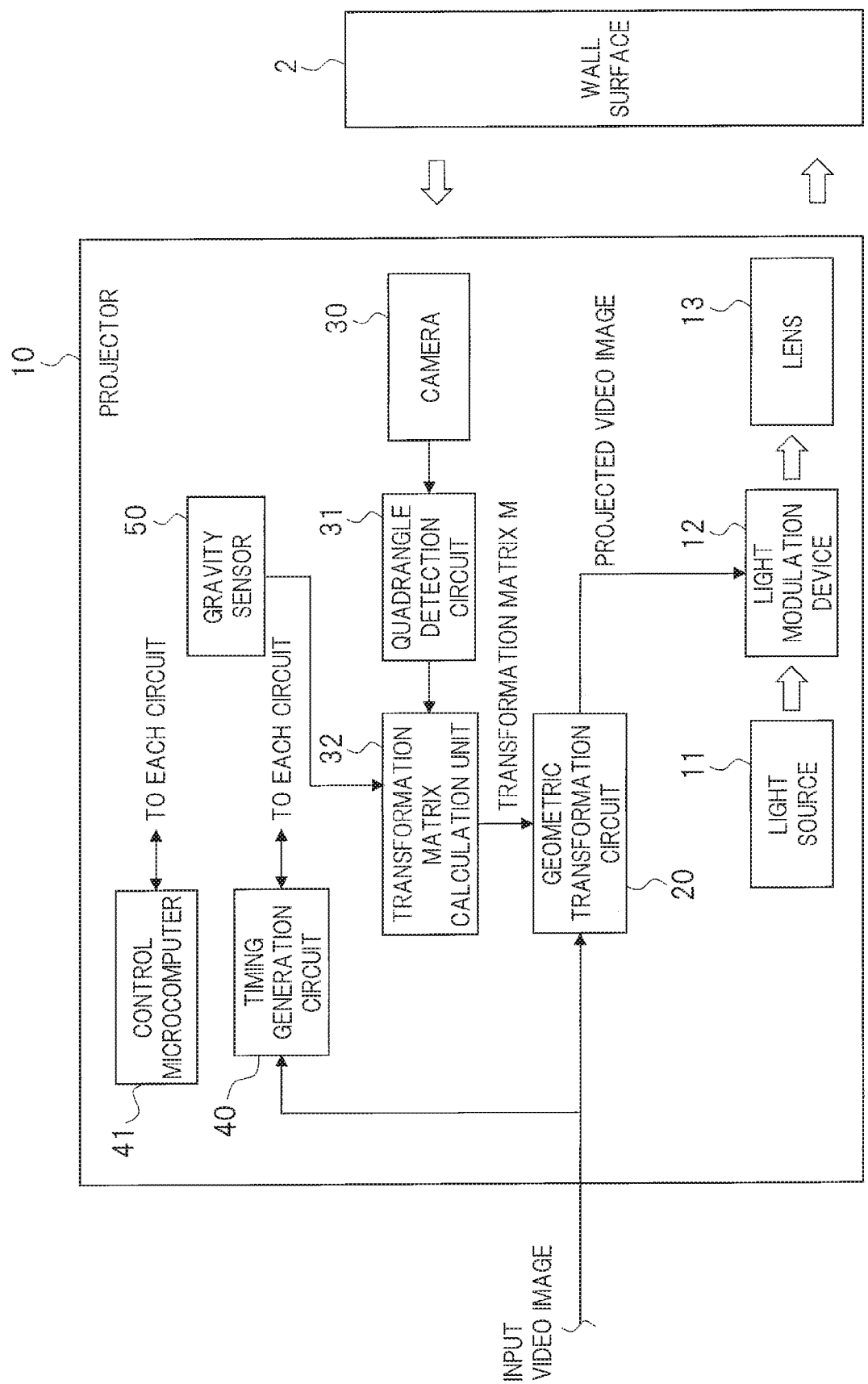
FIG. 11 is an explanatory diagram showing an example of a configuration of a projector according to Embodiment 2.

FIG. 11 is an explanatory diagram showing an example of a configuration of the projector 10 according to Embodiment 2.

The projector 10 shown in FIG. 11 is different from the projector of FIG. 2 in Embodiment 1 in that a gravity sensor 50 is newly added. The other configuration is similar to that of FIG. 2 in Embodiment 1, and so will be omitted.

The gravity sensor 50 as a tilt sensor detects a tilt of the projector 10. The gravity sensor 50 is a device capable of detecting a direction in which gravity acts similarly to an acceleration sensor used for, for example, a smartphone etc. Use of the gravity sensor 50 makes it possible to detect how much the projector 10 is tilted with respect to a horizontal plane.

<Projection and Correction Examples of Projector Using Cards>

Figure 12:
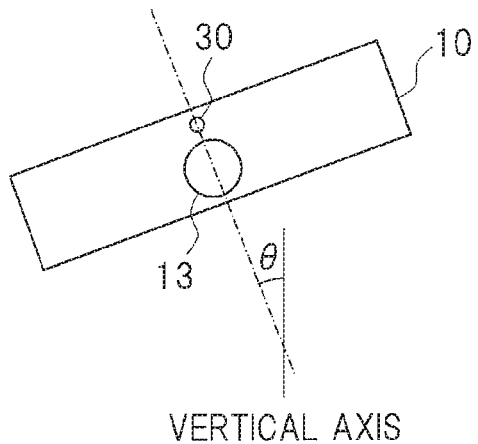
FIG. 12 is an explanatory diagram showing an example of a case where the projector is placed so as to be tilted with respect to a horizontal plane.
Figure 13:
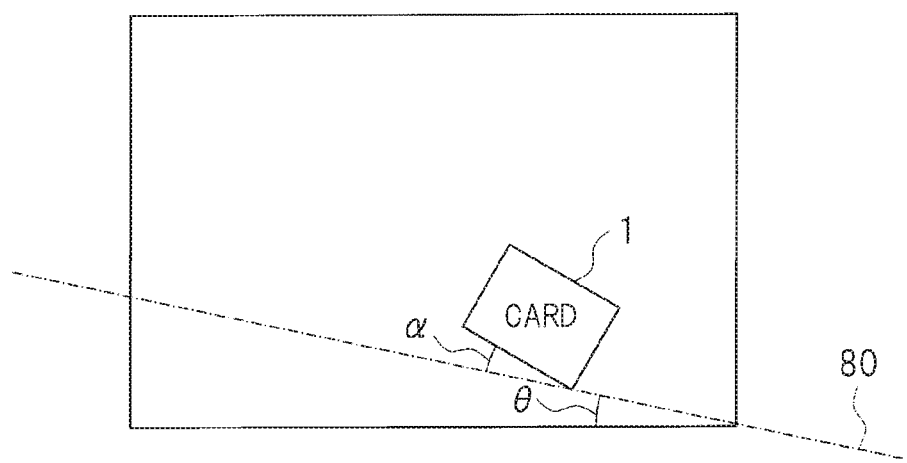
FIG. 13 is an explanatory diagram showing an example of a camera video image captured by a camera included in the projector of FIG. 12.

FIG. 12 is an explanatory diagram showing an example in a case where the projector 10 is tilted to the horizontal plane and placed. FIG. 13 is an explanatory diagram showing an example of a camera video image by the camera 30 that the projector 10 of FIG. 12 has.

As shown in FIG. 12, the projector 10 is placed so as to have an angle with respect to a vertical axis. Providence of the gravity sensor 50 makes it possible to obtain an angle $\theta$ formed between a central axis of the projector 10 and a vertical direction.

Here, when the card 1 is kept tilted only by an angle $\alpha$ from an actual horizontal direction, the video image of the camera 30 becomes a video image as shown in FIG. 13. In FIG. 13, a horizontal line 80 is a line showing the actual horizontal direction, and is not reflected in an actual camera video image.

Here, by using a detection result(s) of the gravity sensor 50, the geometric correction is performed to the projected video image of the projector 10 with an influence of a tilt $\alpha$ of the card 1 on the result being removed. The tilt angle $\theta$ of the projector 10 itself acts in an inverse direction to both of directions at a photographing time by the camera 30 and at a video-image-projecting time by the projector 10, so that the both directions are eventually canceled out. Therefore, only the tilt angle $\alpha$ of the card 1 may be considered without considering the influence of the angle $\theta$ in calculating the transformation matrix M.

Use of the camera video image shown in FIG. 13 makes it possible to obtain a value of $\alpha+\theta$ which is the tilt angle of the card 1 in the camera coordinate system. Meanwhile, since a value of the angle $\theta$ can be obtained from a detection value(s) of the gravity sensor 50, a value of the angle $\alpha$ can be obtained by performing subtraction between the two angles. These processings are performed by the transformation matrix calculation circuit 32, for example.

<Calculation Processing Example of Transformation Matrix M>

A processing for obtaining the transformation matrix M in consideration of this angle α will be described with reference to FIGS. 14 and 15.

Figure 14:
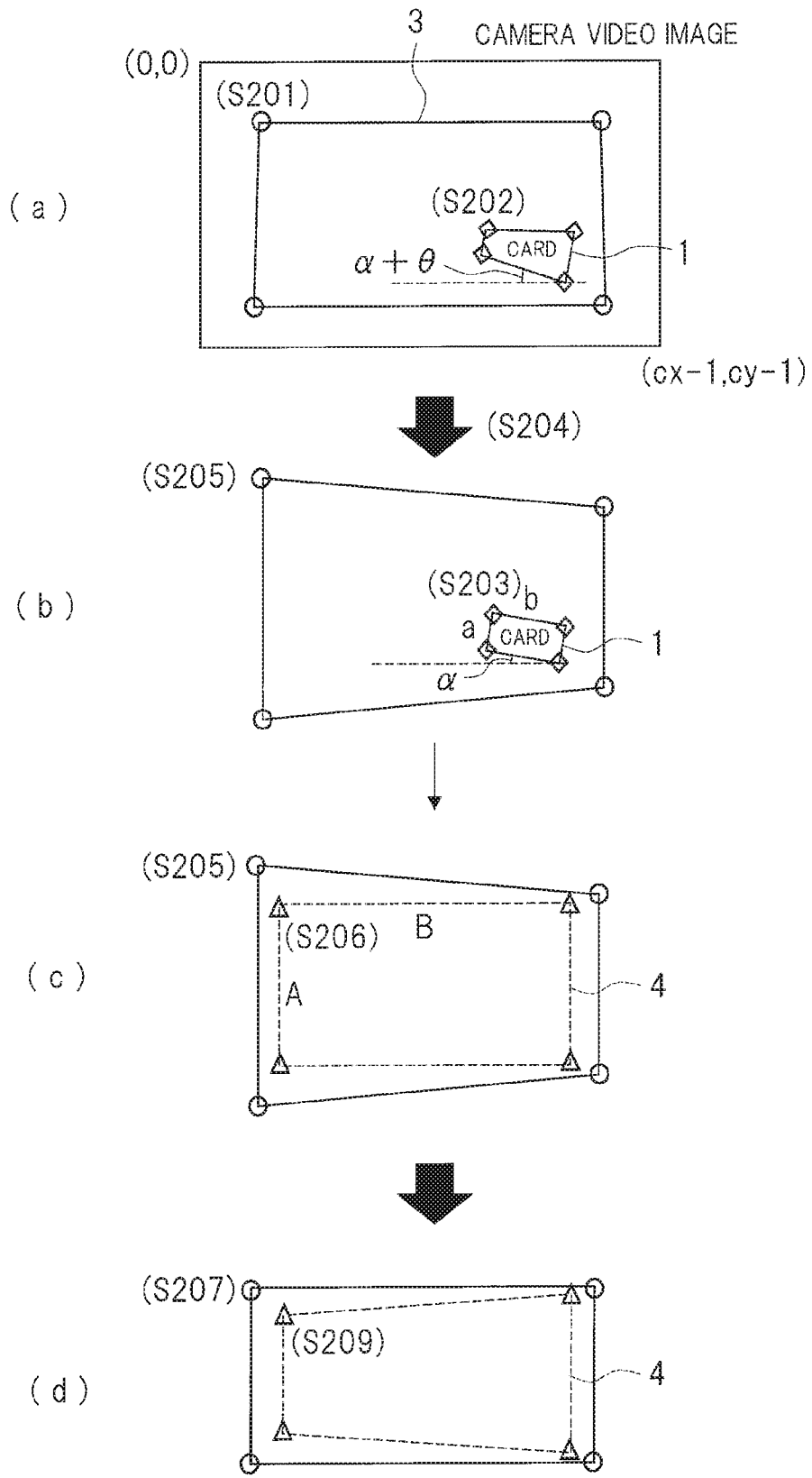
FIG. 14 is an explanatory diagram showing a processing example of each coordinate system.

FIG. 14 is an explanatory diagram showing a processing example in each coordinate system. FIG. 15 is a flowchart showing an example of a calculation processing of the transformation matrix M by the transformation matrix calculation circuit 32 that the projector 10 of FIG. 13 has.

FIG. 14 represents three coordinate systems required in a process of calculating the transformation matrix M similarly to FIG. 9 of the above-mentioned embodiment. FIG. 14(a) shows a camera coordinate system, and FIGS. 14(b) and 14(c) each show a front-view coordinate system. FIG. 14(d) shows an input video-image coordinate system.

Here, since a basic flowchart is common to those of FIGS. 9 and 10 of Embodiment 1 described above, only a difference therebetween will be described.

First, in the camera image coordinate system shown in FIG. 14(a), the card 1 is photographed in a state of tilting by an angle of α+θ, which makes it possible to calculate an angle α from a photographed image and a measured value of the gravity sensor as described above (step S201).

Additionally, in a processing of step S203, the front-view coordinate system is defined by using this angle α so that the card 1 has an aspect ratio of a:b and becomes a rectangle tilted only by the angle α. Applied to a scale is the same manner as that of Embodiment 1.

The other processings are performed similarly to those of FIG. 10 in Embodiment 1, and the transformation matrix M is obtained. Using this transformation matrix M to perform the perspective transformation makes it possible to perform the keystone correction of the projected video image.

As described above, even when the card 1 is tilted, the correction processing of the projected video image can be performed, so that convenience can be further enhanced.

Embodiment 3

<Outline>

In Embodiment 1 described above, the projected video image is transformed so that the tilt of the projected video image is linked to the tilt of the card 1. Thus, the operation of the card by the user has made it possible to easily adjust the tilt of the projected video image.

Meanwhile, in Embodiment 2 described above, the tilt of the card 1 does not affect the tilt of the projected video image. This leads to unnecessity of strictly keeping the card 1 horizontal, and to a system having good usability in always projecting the video image horizontally.

Described in Embodiment 3 will be the projector 10 having a mechanism for switching the above embodiments to each other. First, mode switching is added to a not-shown operation menu in the projected video image projected by the projector 10 so that a FIG. 10 processing (first mode) of Embodiment 1 and a FIG. 15 processing (second mode) of Embodiment 2 can be selected respectively. This is based on preference of the user so as to be manually selectable about which of the FIG. 10 processing of Embodiment 1 and the FIG. 15 processing of Embodiment 2 is to be performed. Incidentally, the configuration of the projector 10 is similar to that of the projector 10 shown in FIG. 11 of Embodiment 2. These mode changes may be realized by the control microcomputer 41 controlling each circuit.

As described above, a mode for keeping the video-image-transformed video image horizontal and a mode for linking the video-image-transformed video image with the tilt of the card as a correction-operated object can be selected based on the user's preference. This makes it possible to provide the projector 10 having further usability.

Next, described as a modification of Embodiment 3 will be an example of automatically changing the selection of the above-mentioned first and second modes.

<Installation Example of Projector>

Figure 16:
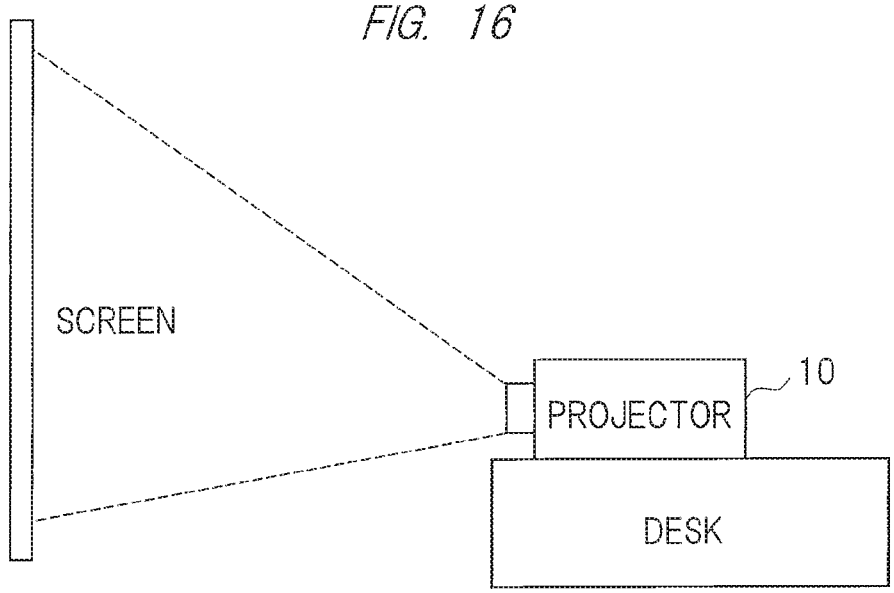
FIG. 16 is an explanatory diagram showing an example of installation of a projector according to Embodiment 3.
Figure 17:
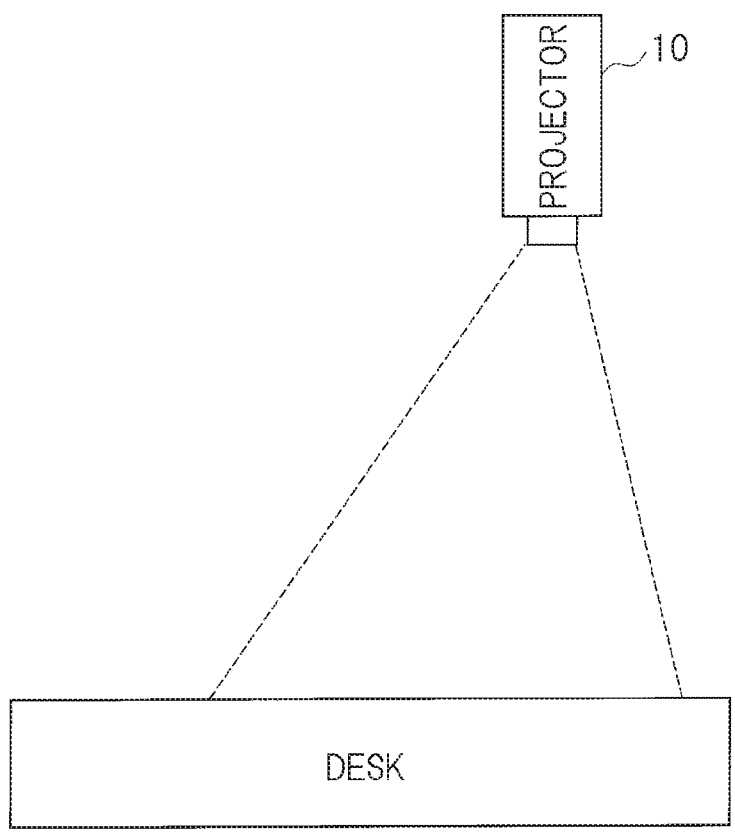
FIG. 17 is an explanatory diagram showing another example of FIG. 16.

FIG. 16 is an explanatory diagram showing an example of installation of a projector 10 according to a modification of Embodiment 3. FIG. 17 is an explanatory diagram showing another example of FIG. 16. FIG. 16 shows an example of installing the projector 10 sideways, and FIG. 17 shows an example of installing the projector 10 longitudinally.

In the modification of Embodiment 3, the above-mentioned operation menus can be automatically switched by using, for example, the gravity sensor 50 of FIG. 11. As shown in FIG. 16, when the projector 10 is installed sideways and projects the video image onto a vertical screen, it is convenient to always project horizontally the projected video image without considering the tilt of the projected video image in a rotational direction. That is, when the projector 10 projects the video image onto the vertical screen, the control microcomputer 41 performs control for selecting the second mode.

Meanwhile, as shown in FIG. 17, when the projector 10 is placed longitudinally and projects the video image onto a horizontal surface such as a desk from above, the processing of using the gravity sensor 50 as shown in Embodiment 2 has no meaning. In that case, it is reasonable to perform the processing shown by FIG. 10 of Embodiment 1. That is, when the projector 10 projects the video image onto the horizontal surface, the control microcomputer 41 performs control for selecting the first mode.

Which of cases of FIGS. 16 and 17 a usage pattern of the projector 10 corresponds to can be judged by determining an installation posture of the projector 10 based on a detection result(s) of the gravity sensor 50 of FIG. 11.

Figure 15:
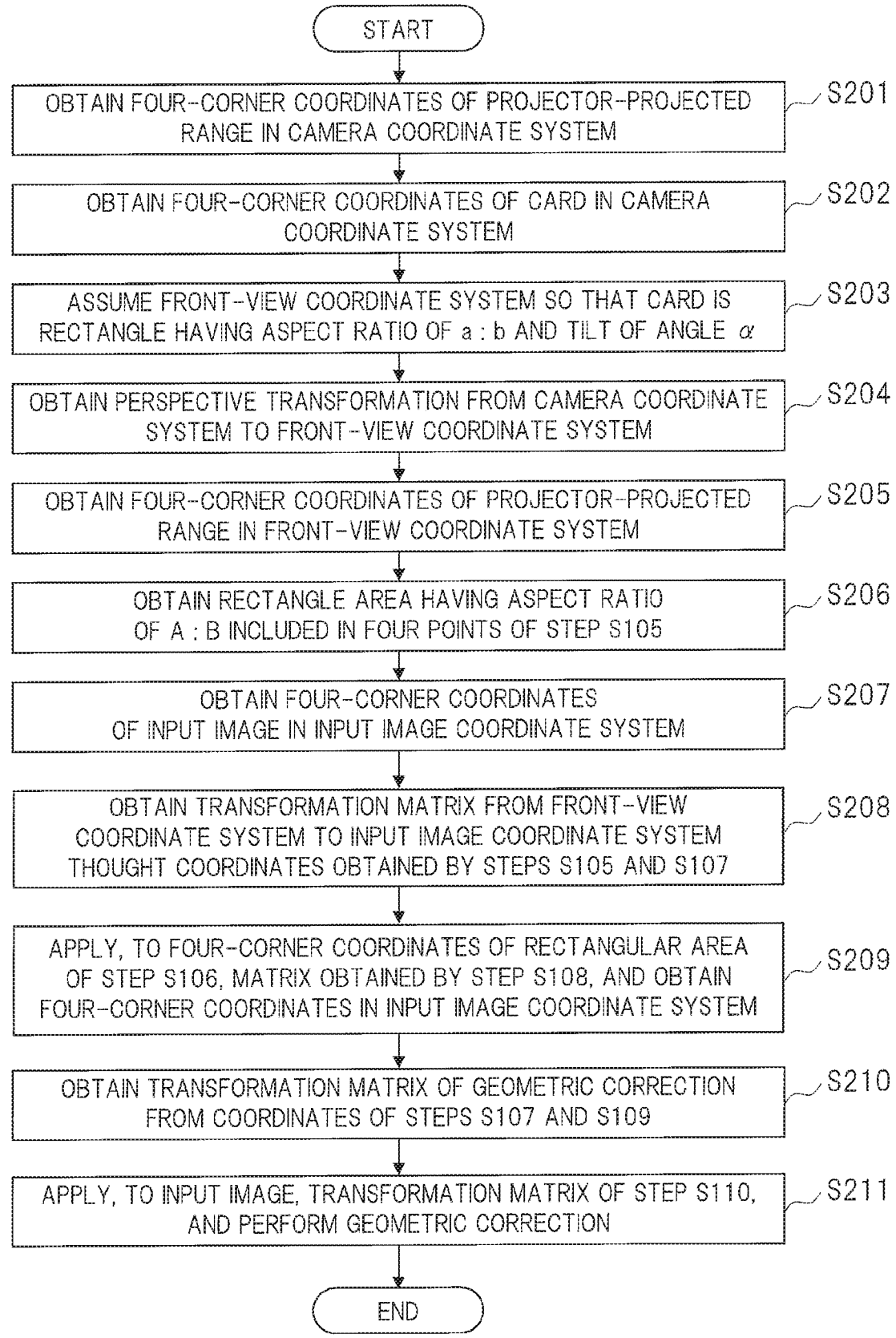
FIG. 15 is a flowchart showing an example of a calculation processing of a transformation matrix M by a transformation matrix calculation circuit included in the projector of FIG. 13.

Based on the detection result of the gravity sensor 50 of FIG. 11, the control microcomputer 41 controls a transformation matrix calculation processing of the transformation matrix calculation circuit 32 so as to select and use any processing of the first mode (processing in FIG. 10) or the second mode (processing in FIG. 15). This makes it possible to realize automation of the mode switching.

Incidentally, the above example has indicated that the control microcomputer 41 performs the control for selecting the second mode when the projector 10 projects the video image onto the vertical screen. However, when the projector 10 projects the video image onto the vertical screen, the control microcomputer may perform the control so as to select a mode previously selected by the user's preference via the menu without forcibly selecting the second mode.

As described above, regardless of whether the projector 10 is installed sideways or longitudinally, the mode for keeping the video-image-transformed video image horizontal and the mode for linking the video-image-transformed video image with the tilt of the card as the correction-operated object can be preferably selected. This makes it possible to provide the projector 10 having further usability.

Embodiment 4

<Outline>

As described above, it is assumed in Embodiments 1 to 3 that a card such as a business card or A4-sized paper is used as the card 1. However, such a card may not be found out near the projector 10 in using the projector in some cases.

<Configuration Example of Lens Cap>

In preset Embodiment 4, described will be a technique for realizing a function corresponding to the card 1 by attachment accessories of the projector 10 to prepare for the above cases.

Figure 18:
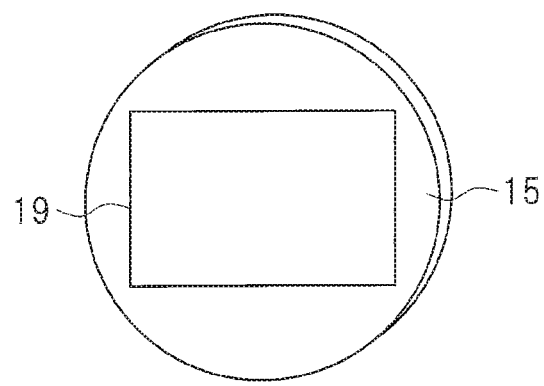
FIG. 18 is an explanatory diagram showing an example of a lens cap according to Embodiment 4.

FIG. 18 is an explanatory diagram showing an example of a lens cap 15 according to Embodiment 4.

The lens cap 15 shown in FIG. 18 is attached to the lens 13 that the projector 10 has, and protects a lens surface of the lens 13 by attachment to the projector, for example, with the projector 10 not used.

Adhered to aback side of the lens cap 15 is a white rectangular label 19 used as a substitute for the card 1 of FIG. 3. Even when the card 1 is not found, holding the lens cap 15 as its substitute in front of the camera 30 means to have the same function as that of the card 1, thereby making it possible to perform the geometric correction.

Figure 19:
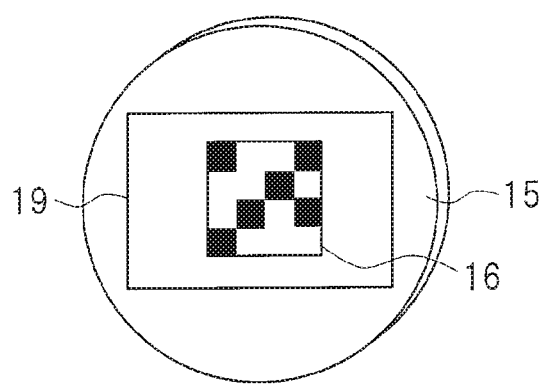
FIG. 19 is an explanatory diagram showing another example of FIG. 18.

Subsequently, described will be another example of the lens cap 15. FIG. 19 is an explanatory diagram showing another example of FIG. 18.

<Another Configuration Example of Lens Cap>

The lens cap 15 shown in FIG. 19 is different from the lens cap 15 in FIG. 18 in that a special pattern such as a two-dimensional bar code 16 is printed on a back-side rectangular label 19 of the lens cap 15.

In this way, printing the two-dimensional bar code 16 on the label 19 makes it possible to switch to a mode for automatically performing the geometric correction by using the camera 30 when the special pattern, i.e., the two-dimensional bar code 16 exists in a camera video image. When the two-dimensional bar code 16 exists, the keystone correction can be automatically performed to the projected video image shown in each of Embodiments 1 to 3 described above.

Whether the two-dimensional bar code 16 serving as a correction processing pattern exists or not is determined by, for example, the quadrangle detection circuit 31 etc. shown in FIG. 2. Alternatively, the control microcomputer 41 may perform the above determination.

Incidentally, here, adopted is a configuration of printing the two-dimensional bar code 16 on the label 19. For example, however, the two-dimensional bar code 16 may be printed on each of the cards 1 of Embodiments 1 to 3 described above.

In this case, existence of the two-dimensional bar code 16 on the card 1 makes it possible to automatically switch to the mode for performing the geometric correction by using the camera.

As described above, even when the card 1 or the like is absent, the projected video image can be easily corrected, so that the correction processing of the projected video image can be performed more easily and in a short time.

Embodiment 5

<Outline>

Described in Embodiment 5 will be a technique for using a smartphone or the like as a substitute for the card 1.

In this case, a liquid crystal screen that the smartphone has is set to a full solid white state, and is used as a substitute for the card 1. Then, the liquid crystal screen is held in front of the camera 30 of FIG. 2, thereby performing the correction processing to the projected video image instead of the card 1.

Each of Embodiments 1 to 4 described above needs information on the aspect ratio of the card 1, but an aspect ratio of the screen of the smartphone is different for each model. Therefore, a normal aspect ratio is supposed to be, for example, 16:9 or the like, and a subsequent proceeding(s) will be performed.

<Display Example of Liquid Crystal Screen>

Figure 20:
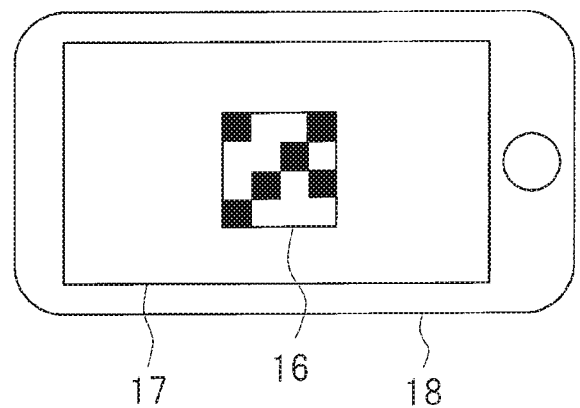
FIG. 20 is an explanatory diagram showing an example of display on a liquid crystal screen included in a smartphone according to Embodiment 5.

FIG. 20 is an explanatory diagram showing an example of display on a liquid crystal screen 17 included in a smartphone 18 according to Embodiment 5.

Additionally thereto, as shown in FIG. 20, a two-dimensional bar code 16 may be displayed on a liquid crystal screen 17 of a smartphone 18. This two-dimensional bar code 16 is almost the same as the two-dimensional bar code 16 of FIG. 19 in Embodiment 4 described above. Then, information on an aspect ratio of the screen is notified to the projector 10 by combination with the two-dimensional bar codes 16 that are displayed on the liquid crystal screen 17.

In this case, for example, the control microcomputer 41 etc. in FIG. 2 decode the two-dimensional bar code 16 appearing in the camera video image and acquire the information on its aspect ratio, and the projector 10 of FIG. 2 uses it to calculate the transformation matrix M of FIG. 2.

As described above, even when the card 1 or the like is absent, the projected video image can be corrected, so that the correction processing can be performed to the projected video image easily and in a short time.

In the foregoing, the invention made by the inventors of the present invention has been concretely described based on the embodiments. However, it is needless to say that the present invention is not limited to the foregoing embodiments and various modifications and alterations can be made within a range not departing from the scope of the present invention.

Note that the present invention is not limited to the embodiments described above and includes various modification examples. For examples, the embodiments above have been described in detail so as to make the present invention easily understood, and the present invention is not always limited to the embodiment having all of the described constituent elements.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

EXPLANATION OF REFERENCE NUMERALS

1 Card;
10 Projector;
11 Light source;
12 Light modulation device;
13 Projection lens;
13 Lens;
14 Control microcomputer;
15 Lens cap;
16 Two-dimensional bar code;
19 Label;
17 Liquid crystal screen;
18 Smartphone;
20 Geometric transformation circuit;
30 camera;
31 Quadrangle detection circuit;

32 Transformation matrix calculation circuit;
40 Timing generation circuit;
41 Control microcomputer; and
50 Gravity sensor.

The invention claimed is:

1. A projection type video-image display apparatus projecting a video image, the apparatus comprising:
a first processor configured to perform video-image transformation to a video image inputted from outside;
a projector configured to project, onto a video-image projection surface, the video image video-image-transformed by the first processor;
an image sensor configured to acquire an image obtained by photographing (1) a projected range of a projected video image projected by the projector and (2) an object for correcting the projected range, the object being not disposed in a same plane as the video-image projection surface; and
a second processor configured to perform a calculation processing by using the image photographed by the image sensor,
wherein the second processor generates correction data from the image of the projected range of the projector and the object, the image being photographed by the image sensor, and
wherein the first processor performs video-image transformation based on the correction data generated by the second processor so that the projected range of the projected video image by the projector becomes rectangular on the video-image projection surface.

2. The projection type video-image display apparatus according to claim 1,
wherein the second processor calculates, based on the image photographed by the imaging sensor, a coordinate to be a reference point in the projected range and a coordinate to be a reference point of the image of the object, uses the coordinates to perform the calculation processing using these coordinates, and calculates a transformation matrix to be correction data, and
the first processor transforms the video image by a transformation processing using the transformation matrix so that the projected range of the projected video image becomes rectangular.

3. The projection type video-image display apparatus according to claim 1,
wherein the second processor comprises:
a detector configured to calculate first coordinate data and second coordinate data from the projected range and the image of the object, which are photographed by the image sensor, the first coordinate data indicating each of coordinates of four corner portions of the projected range, and the second coordinate data indicating each of coordinates of four corner portions of the object; and
a transformation matrix calculation unit configured to calculate third coordinate data indicating each of coordinates of such four corner portions that the image of the object becomes rectangular, and calculates a transformation matrix to be the correction data based on correspondences to the calculated third coordinate data and second coordinate data, and
the first processor uses the transformation matrix calculated by the transformation matrix calculation unit, performs perspective transformation to the first coordinate data calculated by the detector, and transforms the video image so that the projected range of the projected video image becomes rectangular.

4. The projection type video-image display apparatus according to claim 1, further comprising a tilt sensor configured to detect a tilt of the projection type video-image display apparatus,
wherein the second processor uses a detection result of the tilt sensor, and generates the correction data so that a lower side of the projected range of the rectangular projected video image video-image-transformed by the first processor becomes horizontal.

5. The projection type video-image display apparatus according to claim 1, further comprising:
a tilt sensor configured to detect a tilt of the projection type video-image display apparatus; and
a controller configured to control the second processor and the first processor,
wherein the controller is switchable between a first mode and a second mode,
the first mode controlling the first processor and the second processor so that the second processor generates the correction data by which a rectangle of the projected range of the projected video image after a transformation processing by the first processor is tilted in conjunction with the tilt of the object, and
the second mode controlling the first processor and the second processor based on a tilt detection result of the tilt sensor so that the second processor generates the correction data by which a lower side of a rectangle of the projected range of the projected video image after a transformation processing by the first processor becomes horizontal.

6. The projection type video-image display apparatus according to claim 1, wherein the object is a rectangular card.

7. The projection type video-image display apparatus according to claim 6, wherein the card is provided to a lens cap for protecting a lens that the projector has.

8. The projection type video-image display apparatus according to claim 7, further comprising a controller configured to control the first processor and the second processor,
wherein the controller determines whether a predetermined correction processing pattern is present or absent on an image of the card photographed by the image sensor, and controls the first processor and the second processor so as to perform the video-image transformation when the predetermined correction processing pattern is present.

9. A projected video-image adjusting method for a projection type video-image display apparatus, the apparatus including:
a first processor configured to perform video-image transformation to a video image inputted from outside;
a projector configured to project, onto a video-image projection surface, the video image video-image-transformed by the first processor;
an image sensor configured to acquire an image obtained by photographing (1) a projected range of a video image projected by the projector and (2) an object for correcting the projected range; and
a second processor configured to perform a calculation processing to the image photographed by the image sensor,
wherein the method comprises:
photographing, by the image sensor, the image of the projected range projected by the projector and the object that is not disposed in a same plane as the video-image projection surface;

generating, by the second processor, correction data from the image of the projected range and the object, the image being photographed by the image sensor; and performing, by the first processor, video-image transformation based on the correction data generated by the second processor so that the projected range of the projected video image by the projector becomes rectangular.

10. The projected video-image adjusting method according to claim 9, wherein, in generating the correction data, a coordinate to be a reference point in the projected range and a coordinate to be a reference point of the image of the object are calculated based on the image photographed by the image sensor, a calculation operation is performed by using the coordinates, and a transformation matrix to be the correction data is calculated, and in performing the video-image transformation, the video image is transformed by a transformation processing using the transformation matrix so that the projected range of the projected video image becomes rectangular.

11. The projected video-image adjusting method according to claim 9, wherein generating the correction data comprises:

obtaining first coordinate date and second coordinate data from the projected range and the image of the object that are acquired by the image sensor, the first coordinate data indicating each of coordinates of four-corner portions of the projected range, and the second coordinate data indicating each of coordinates of four-corner portions of the object;

calculating third data coordinate indicating each of coordinates of such four-corner portions that the image of the object becomes rectangular; and calculating a transformation matrix to be the correction data based on correspondences to the second coordinate data and the third coordinate data, and performing the video-image transformation uses the transformation matrix, performs perspective transformation to the first coordinate data in the projected range, and makes an adjustment so that the projected range of the projected video image becomes rectangular.

12. The projection type video-image display apparatus according to claim 2, further comprising a tilt sensor configured to detect a tilt of the projection type video-image display apparatus, wherein the second processor uses a detection result of the tilt sensor, and generates the correction data so that a lower side of the projected range of the rectangular projected video image video-image-transformed by the video-image transformation unit becomes horizontal.

13. The projection type video-image display apparatus according to claim 3, further comprising a tilt sensor configured to detect a tilt of the projection type video-image display apparatus, wherein the second processor uses a detection result of the tilt sensor, and generates the correction data so that a lower side of the projected range of the rectangular projected video image video-image-transformed by the first processor becomes horizontal.

* * * * *